3,401,070
RESIN COATING
Gordon E. Brown, Seattle, Wash., assignor to Monsanto Company, St. Louis, Mo., a corporation of Delaware
No Drawing. Continuation-in-part of application Ser. No. 390,183, Aug. 17, 1964. This application May 19, 1965, Ser. No. 457,199
8 Claims. (Cl. 156—230)

ABSTRACT OF THE DISCLOSURE

This application describes applying a thermosetting resin coating to a substrate by forming a layer of a composition comprising a thermosetting resin and a parting agent on a transfer surface having a volatile content of 2 to 20% by weight of the total weight of the layer and hot-pressing the thus formed resinous layer onto a substrate. The resinous layer provides a functional surface to the substrate.

---

This application is a continuation-in-part of Ser. No. 390,183, filed Aug. 17, 1964.

This invention relates to a method for applying a thermosetting resin coating to a substrate. More particularly, it relates to a novel transfer coating technique for applying a thermosetting resin coating to a substrate.

There is considerable present day interest in providing structural units, principally of wood, having decorative and/or functional surfaces. However, these methods require an operation wherein the resinous coating is preimpregnated on a paper which is subsequently laminated to a substrate, or wherein the resinous coating is sprayed, brushed or rolled on a substrate and then dried. Although this invention is not to be limited in this regard, a particular problem exists in applying the existing coating processes to the fabrication of resin surfaced particle board prepared from comminuted cellulosic waste. Presently, to prepare such structural units a mat of resin coated cellulosic waste particles must first be compressed into a particle board and then the surface coating is applied by conventional techniques to one or more faces of the finished particle board. Attempts to use conventional coating techniques in applying a resin overlay to the cellulosic waste prior to compression results in a disruption of the prepress mat.

A further aspect of this problem is the difficulty in using conventional rolling, spraying or brushing techniques to deposit a uniform and continuous resin film on the substrate so that after cure the resin surface will completely protect the underlying substrate. To date the only means for guaranteeing a continuous and unbroken film free from voids is by pre-impregnating a print sheet which is then laminated to the substrate.

It is an object of this invention to provide a novel method for applying a thermosetting resin coating to a substrate.

Another object of this invention is to provide a method whereby a thermosetting resin surface is placed on particle board in one step at the time the loose mat of comminuted cellulosic waste is compressed.

Another object is the provision of a method for applying a thermosetting resin surface to a substrate whereby the resinous surface is fully continuous and protective of the underlying substrate.

Another object is the provision of functional and/or decorative resinous surfaces to substrates.

These and other objects are attained through the method of applying a thermosetting resin coating to a substrate which comprises:

(a) Coating on a transfer surface an aqueous composition comprising thermosetting resin solids and a parting agent, (b) Drying the coated transfer surface to a volatile content of from 2 to 20% by weight based on the total weight of the coating and short of final cure of the thermosetting resin, (c) Placing the coated side of the transfer surface in contact with a surface of the substrate, (d) Hot-pressing the coated transfer surface and substrate assembly at a temperature of from 230° to 380° F. and a pressure of from 50 to 500 p.s.i., and (e) Removing the transfer surface.

The following examples are presented in llustration of this invention and are not intended as limitations thereon. Where parts are mentioned, they are parts by weight unless otherwise specified.

EXAMPLE I

This example illustrates transfer coating on a substrate of resin coated comminuted wood to make a surface coated synthetic veneer.

2400 grams of hammermill ground Douglas fir chips (100% through an 8 mesh U.S. sieve screen) are blended with 420 grams of an aqueous alkaline solution of a phenolic resin containing about 40% resin solids by weight and prepared by condensing 1.0 molar proportion of phenol with about 2.25 molar proportions of formaldehyde in the presence of 0.25 molar proportions of sodium hydroxide under reflux conditions. The resin coated wood chips are then deposited on a 2′ by 4′ stainless steel caul in a mat of substantially uniform thickness. To this mat is then applied, using a gravity duster, about 240 grams of a mixture of wood fibers having a bulk density of about 0.065 gram/cc. and a phenolic resin containing about 40% solids by weight and prepared by condensing 1.0 molar proportion of phenol with about 0.3 molar proportion of formaldehyde in the presence of 0.2 molar proportion of lime while cooking at about 150° F. for 2.75 hours; said resin being neutralized to a pH of about 6.0 by bubbling carbon dioxide through the resin and filtering out calcium carbonate and said resin having a number average molecular weight of about 243. A 2′ by 4′ stainless steel caul is coated, at an application rate of 17 pounds per 1000 square feet, with an aqueous slurry of the following formulation wherein the phenolic resin is the same lime catalyzed phenolformaldehyde condensate used above in admixture with the low bulk density wood fibers.

| Component: | Parts |
|---|---|
| Aqueous phenolic resin solution | 100 |
| ASP 100 clay | 40 |
| Titanium dioxide pigment | 10 |
| Potassium soap of tall oil and soybean oil | 10 |

The coated caul is then dried in a 130° F. oven for 20 minutes to a volatile content of about 10%. The thus prepared resin coated caul is then placed on the wood fiber-phenolic resin mixture surface and the assembly is hot-pressed in a press having stops set at about 0.16″ thickness at about 300° F. and 175 p.s.i. for 7 minutes. Products made using this transfer resin film coating technique have a surface of a continuous resin film and exhibit excellent paint holdout, providing, in effect, preprimed surfaces whereon one-coat paint coverage can be achieved. Modulus of rupture tests on specimens measuring 2″ by 8″ by 0.16″ thick across a 6″ span using a 2″ per minute head speed show the following results:

| Position: | MOR, lbs./sq. in. |
|---|---|
| Overlay on top (strength of substrate) | 1310 |
| Overlay on bottom (strength of overlay) | 2130 |

Example II

A 2' by 4' Teflon coated steel caul is coated with 3 coats, at an application rate of 80 grams per coat, of an aqueous slurry of the following formulation, drying after each coat in a 130° F. oven for 20 minutes; the final volatile content being from 5 to 10%.

| Component: | Parts |
| --- | --- |
| Aqueous melamine resin solution | 225 |
| Titanium dioxide pigment | 165 |
| ASP 100 clay | 30 |
| Butadiene/styrene copolymer latex | 40 |
| Potassium soap of tall oil and soybean oil | 10 |

The aqueous melamine resin solution is a 50% solids by weight solution of a condensate of a condensate of 1.0 molar proportion of melamine and 2.75 molar proportions of formaldehyde. The butadiene/styrene copolymer latex is a 48% solids aqueous latex of a 1:1 molar ratio butadiene to styrene copolymer.

The thus prepared resin coated caul is then placed on a 2' by 4' sheet of 5 ply Douglas fir plywood measuring ¾" thick and the assembly is hot-pressed at about 375° F. and 175 p.s.i. for 5 minutes. The resulting resin-coated plywood has a surface of a continuous resin film and exhibits good paint holdout, providing, in effect, a pre-primed surface whereon one-coat paint coverage can be achieved.

Example III

A 2' by 4' Teflon coated steel caul is coated with 68 grams of an aqueous slurry of the following formulation and then dried in a 130° F. oven for 10 minutes to a volatile content of from 15 to 20%.

| Component: | Parts |
| --- | --- |
| Aqueous phenolic resin solution | 60 |
| Butadiene/styrene copolymer latex | 30 |
| Powdered aluminum pigment | 10 |
| Potassium soap of tall oil and soybean oil | 6 |

The aqueous phenolic resin is that employed in Example I and the butadiene/styrene copolymer latex is a 48% solids aqueous latex of a 1:1 molar ratio butadiene to styrene copolymer.

The thus prepared resin coated caul is then placed on a 2' by 4' sheet of ¾" particle board and the assembly is hot-pressed at about 375° F. and 157 p.s.i. for 5 minutes. The resulting resin-coated particle board has a surface of a continuous resin film and presents a finished decorative effect ready for use as is as a structural unit, e.g., wall paneling.

In summary, the novel method of this invention comprises coating a transfer surface with an aqueous thermosetting resin coating composition, then drying the coating transfer to a volatile content in the range of from 2 to 20% by weight based upon the total weight of the coating so as to only partially cure the thermosetting resin to a state wherein it may be further cured during its subsequent application to the substrate, then placing the coated side of the transfer surface in contact with the surface of the substrate, then hot-pressing the coated transfer surface and substrate assembly, and finally, removing the transfer surface.

The transfer surface may be any surface conforming to the configuration of the substrate. In a preferred embodiment wherein flat structural units of plywood, particle board, etc. are prepared, the transfer surface is preferably a stainless steel caul or a Teflon caul. As will be obvious, the use of a transfer surface containing a design imprint will, in certain instances, be advantageous.

The aqueous coating composition employed may comprise any conventional thermosetting resin in combination with a minor proportion of a release agent. Typical thermosetting resins which may be employed are aqueous alkaline phenol-formaldehyde condensates, aqueous alkaline melamine-formaldehyde condensates, various aminoplasts such as urea-formaldehyde condensates, benzoguanamine condensates, etc. In general, these are aqueous solutions containing from about 20 to 60% by weight of thermosetting resin solids.

The release agent may be any of the water-soluble mold release agents known in the art and their presence is required only in such degree that it is necessary to enable easy separation of the transfer surface from the coated substrate after the hot-press operation.

For various specialized applications, the aqueous coating composition can appropriately contain added ingredients designed to provide decorative and/or functional properties. For example, various organic, inorganic and metallic pigments may be used for decorative effect in concentrations such as to give the desired hiding power or aesthetic appearance. Clay has been found to be a desirable ingredient when functional surfaces are desired to provide a maximum protection of the substrate. Clay is particularly desirable when the structural unit is intended as a preprimed paintable surface suitable for one-coat application of a finish paint. Similarly, it has been found desirable to incorporate into the aqueous coating composition an elastic thermoplastic polymer such as, for example, a butadiene/styrene copolymer to provide a resilient surface resistant to mars and impact.

The transfer surface is coated with an aqueous coating composition in a film thickness approximating that desired on the finished substrate. The film may be deposited on the transfer by any of the conventional means such as roll coating, spraying, brushing, etc.; using one or more coats. When it is chosen to employ more than one coat on the transfer surface, the coated transfer surface should be dried after each coating to ensure a uniform and continuous build-up of the coating composition. The coated transfer surface is dried to a volatile content in the resinous coat of from 2 to 20% by weight, based on the total weight of the coating. However, the drying conditions should be selected within the skill of those in the art such that the thermosetting resin does not advance during this drying to its final state of cure. That is, after drying, the resin should possess some and preferably considerable susceptability to further cure in order that adequate bond to the substrate may be established during the subsequent hot-pressing.

The coated side of the transfer surface is then placed in contact with a surface of the substrate and the resulting assembly is hot-pressed at a temperature of from 230° to 380° F. and a pressure of from 50 to 500 p.s.i. The exact pressing conditions will, of course, be at least in part determined by the nature of the substrate being coated. For example, to apply a coating to a preformed plywood or particle board substrate, lower temperatures and pressure can be employed since it is only necessary to effect a bond between the coating and the substrate and effect further cure of the coating on the substrate. However, when the coated transfer surface is placed in contact with a loosely deposited mat of resin coated comminuted cellulosic waste, it is necessary that the hot-press step be sufficient to consolidate the cellulosic waste into a rigid and firmly bonded structural unit. In such instances conventional pressing conditions of temperature and pressure used in the manufacture of structural units from comminuted cellulosic waste may be employed.

It is obvious that many variations can be made in the products and processes herein described without departing from the spirit and scope of this invention.

What is claimed is:
1. The method of applying a thermosetting resin coating to a substrate which comprises:
   (a) coating on a transfer surface an aqueous coating composition comprising thermosetting resin solids and a parting agent,
   (b) drying the coated transfer surface to a volatile content of from 2 to 20% by weight based on the total weight of the coating and short of final cure of the thermosetting resin, (c) placing the coated side of the transfer surface in contact with a surface of the substrate, (d) hot-pressing the coated transfer surface and substrate assembly at a temperature of from 230 to 380° F. and a pressure of from 50 to 500 p.s.i. and (e) removing the transfer surface.

2. The method as in claim 1 wherein the substrate is wood.

3. The method as in claim 1 wherein the substrate is comminuted cellulosic waste coated with a thermosetting resin.

4. The method as in claim 3 wherein the aqueous coating composition is an aqueous phenol-formaldehyde condensate solution.

5. The method as in claim 1 wherein the substrate is plywood.

6. The method as in claim 5 wherein the aqueous coating composition is an aqueous phenol-formaldehyde condensate solution.

7. The method as in claim 1 wherein the substrate is particle board.

8. The method as in claim 7 wherein the aqueous coating composition is an aqueous phenol-formaldehyde condensate solution.

References Cited

UNITED STATES PATENTS

| 2,688,579 | 9/1954 | Meyer | 161—259 XR |
| 2,883,315 | 4/1959 | Palmquist | 161—261 XR |
| 2,965,532 | 12/1960 | Taylor | 156—230 |
| 3,300,361 | 1/1967 | Brown. | |

EARL M. BERGERT, *Primary Examiner.*

M. L. KATZ, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,401,070            September 10, 1968

Gordon E. Brown

It is certified that error appears in the above identified patent and that said Letters Patent are hereby corrected as shown below:

Column 2, line 37, "0.3" should read -- 3.0 --.

Signed and sealed this 10th day of February 1970.

(SEAL)
Attest:

Edward M. Fletcher, Jr.          WILLIAM E. SCHUYLER, JR.
Attesting Officer                Commissioner of Patents